Aug. 15, 1939.  G. FLEISCHEL  2,169,523
PLANETARY TRANSMISSION SYSTEM
Filed Feb. 4, 1936  2 Sheets-Sheet 1
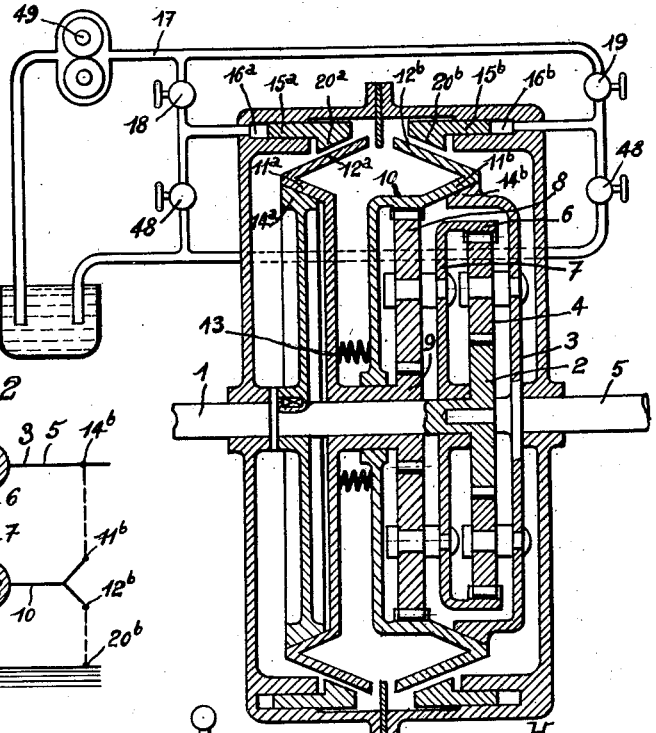
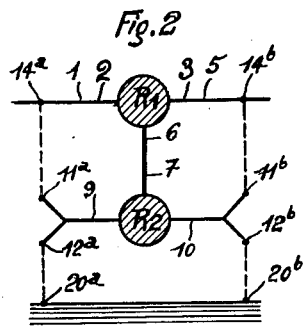
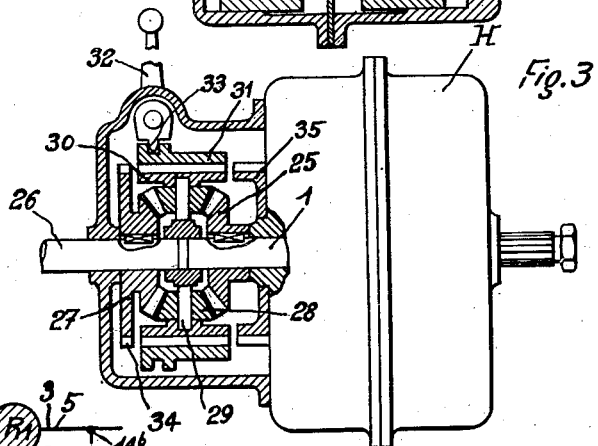
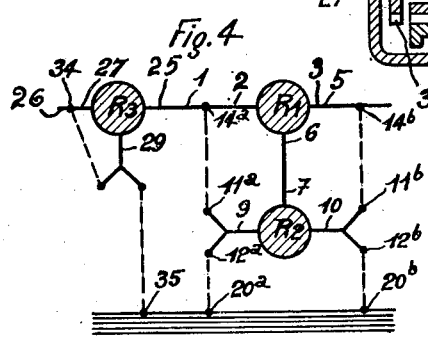
Inventor:
Gaston Fleischel
Attorneys:

Aug. 15, 1939. G. FLEISCHEL 2,169,523
PLANETARY TRANSMISSION SYSTEM
Filed Feb. 4, 1936 2 Sheets-Sheet 2

Inventor:
Gaston Fleischel
Attorneys:

Patented Aug. 15, 1939

2,169,523

UNITED STATES PATENT OFFICE 2,169,523

PLANETARY TRANSMISSION SYSTEM

Gaston Fleischel, Bleneau, France

Application February 4, 1936, Serial No. 62,383
In France December 26, 1935

11 Claims. (Cl. 74—270)

The present invention relates to planetary transmission systems.

The primary object of the invention is to provide a plurality of planetary trains of gearing connected together in a novel manner for obtaining a great variety of different speed ratios.

A further object of the invention is to provide a gearing mechanism of this type in which there is only one connection between two cooperating planetary trains.

Still a further object of the invention is to provide a planetary gearing in which the driving element and the driven element may be connected without utilizing one of the trains.

Still a further object of the invention is to provide a mechanism of this type in which the main train provides the direct drive and the ratio that is most different from direct drive, while the intermediate ratios result from the modification of the control of the auxiliary train.

The invention contemplates generally the use of two planetary trains, each of which has at least three elements. One of these trains constitutes the main train and the other the auxiliary train. One element of the main or principal train is permanently connected to the driving shaft and another to the driven shaft, while a third element of this train is connected to one element of the auxiliary train. The other elements of the auxiliary train are rotatable with respect to the shaft, and means are provided for controlling the two elements of the auxiliary train other than the one which is connected to the main train so as to vary the ratio of transmission of the mechanism.

Preferred embodiments of the present invention will be hereinafter described, with reference to the accompanying drawings, given merely by way of example, and in which:

Fig. 1 is a longitudinal sectional view of a transmission according to the present invention consisting of the combination of two simple trains;

Fig. 2 is a conventional illustration of the same device;

Fig. 3 is a longitudinal sectional view of the combination of a transmission made according to the invention with a simple train;

Fig. 4 is a conventional diagrammatic view corresponding to Fig. 3;

Figure 6:
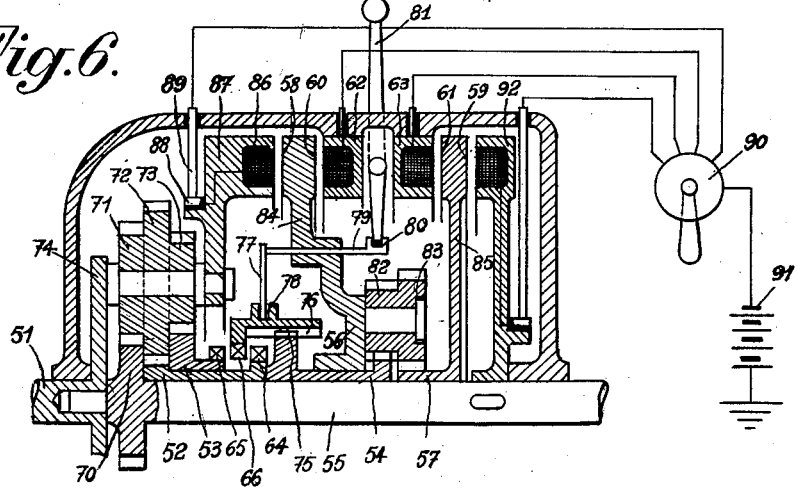
Fig. 6 is a longitudinal sectional view corresponding to Fig. 5.

In Fig. 1, I have shown a planetary transmission capable of giving four different speed ratios, made according to the present invention.

In this embodiment of the invention, the main train is that located on the right hand side of the figure, the coupling or auxiliary train being located on the left thereof. In the main train, the driving element is constituted by shaft 1 and the small sun-wheel 2, having external teeth. The driven element includes the planet wheel carrier 3, with its planet wheels 4, and shaft 5. The third element includes the large orbit-wheel 6, having internal teeth for instance.

It should be borne in mind that these constructional elements might have their respective functions interchanged without modifying the result.

According to the present invention, I rigidly connect the element of the main train which is neither the driving nor the driven element, but in this case the larger orbit-wheel 6, to any element of another train, for instance a simple train, the two other elements of which form the coupling elements of the whole, this last mentioned train being, in view of this arrangement, called coupling or auxiliary train.

For this purpose, I connect, for instance, the large orbit-wheel 6 of the main train with the planet-wheel carrier 7 of the coupling train, the planet wheels of said carrier being shown at 8.

The coupling elements are then the large orbit-wheel 10 of the coupling train and the sun-wheel 9 of the same train. And, in order to render the transmission operative, the working conditions of these two last mentioned elements must be simultaneously controlled.

I arrange the two coupling elements 9 and 10 in such manner that they may be given a slight axial displacement. Each of them is provided with at least one suitable friction surface, for instance two opposed conical elements 11a and 12a for the first coupling element 9, and 11b and 12b for the second coupling element 10.

Springs 13 permanently urge said cones away from one another; these springs apply, on the one hand, cone 11a against another cone 14a rigid with the driving shaft 1, and, on the other hand, cone 11b against cone 14b rigid with shaft 5. The two coupling elements therefore take, in this position, respectively, one the velocity of the driving shaft, and the other one the velocity of the driven shaft.

The second condition of operation for the coupling elements is the full immobilization thereof. For this purpose, I provide, for instance, in the main casing, circular chambers 16a and 16b in which are engaged circular rings 15a and 15b.

A fluid under pressure, for instance oil, can be fed into the annular space thus provided, for instance through a suitable pipe 17 connected to a compressor 49 and provided with distributing means (cocks or valves), such as 18 and 19.

The opposed parts of rings 15a and 15b are given the shape of cones 20a and 20b, respectively. Therefore, if oil under pressure is fed to the chambers above mentioned these cones, by moving axially, can come into contact with cones 12a and 12b of the coupling elements and immobilize them.

I will now explain how I obtain the four speed ratios or gears:

*Fourth gear.*—Through to exhaust valves 48 and 48, oil is caused to escape from chambers 16a and 16b. Under the action of springs 13, cones 11a and 11b are applied against cones 14a and 14b, respectively, this position being shown in the drawings. The coupling train acts as a single rigid unit or block and drives the large orbit-wheel 6 at the same velocity as the engine. Two elements of the main train have the same velocity as the engine, therefore this train also rotates as a single rigid unit and I obtain a gear ratio equal to 1.

*Third gear.*—Oil under pressure is fed to chamber 16a, chamber 16b being left empty. The coupling train then has its large orbit-wheel 10 driven at the same speed as shaft 5 through cones 11b and 14b, while its small sun-wheel 9 is immobilized by cones 12a and 20a which are tightly applied against each other by the oil under pressure in chamber 16a. Planet-wheels 8 are caused to rotate and they impart to their planet wheel carrier 7, and therefore to the large orbit-wheel 6 of the main train, a velocity smaller than the driving velocity. It follows that, through the action of the planet-wheels 4 of the main train, shaft 5 is driven at a lower velocity than in the preceding case.

*Second gear.*—Oil is caused to escape from chamber 16a and, on the contrary, oil under pressure is fed to chamber 16b. Accordingly, the large orbit-wheel 10 of the coupling train moves with a velocity equal to that of the driving shaft. Because of the difference between the diameters of these sun-wheels 2 and 9, and despite the fact that the small sun-wheel 9 is connected to the driving shaft, the angular velocity of the planet-wheel carrier 7 of the auxiliary train, and therefore that of the larger orbit-wheel 6 of the main train, is lower than in the preceding case. Because of the action of planet-wheels 4, belonging to the main train, shaft 5 is also driven at a still lower velocity.

*First gear.*—Oil under pressure is fed simultaneously to chambers 16a and 16b. Because cones 20a and 20b are tightly applied against 12a and 12b, the small sun wheel and the large orbit-wheel of the coupling train are now stopped. It follows that the planet-wheel carrier 7 is stopped, because planet-wheels 8 cannot turn, so that the large sun-wheel of the main train is stopped. This train therefore works as if it had one element immobilized directly, and the gear ratio on shaft 5 is still lower than the preceding case.

It follows from the preceding explanations that, in the preceding example, the main train directly supplies the gear ratio equal to 1 and the other ratio which is most different therefrom (in this case the lowest gear ratio). The coupling train serves to produce the intermediate gear ratios.

The device described just above, complies with the characteristic features of the invention, since the coupling train, constituted by the planet-wheel carrier 7, sun-wheel 9 and orbit-wheel 10, indeed includes the two coupling elements of the system, which, in point of fact, are these two wheels.

It can also be ascertained that there exists a single connection between the two trains, to wit the connection between the orbit-wheel 6 of the main train and the planet-wheel carrier 7 of the coupling train. Furthermore, starting from shaft 1 and following the mechanical elements, to wit planet-wheels 4 and planet-wheel carrier 3, it is possible to reach the driven shaft 5 without passing through the coupling elements 9 and 10.

It can also be ascertained that the main train includes simultaneously the driving group, sun-wheel 2 and resisting element, to wit the planet-wheel carrier 3, with its planet-wheels 4, and that all the coupling elements only concern the coupling train.

These modifications are possible already for the main train, and also for the coupling train, considered separately, which gives a very great number of combinations corresponding to these modifications. Other factors still further increase this number. It is, for instance, possible to arrange the device so that a given intermediate ratio is obtained by locking one element in stationary position and engaging another element. To this system there immediately corresponds another one in which the conditions of coupling are reversed. Finally, it is not absolutely necessary that the main train should supply the extreme ratios. It is therefore necessary to provide new modifications in which the main train supplies the first and second gear ratios or the first and fourth gears, instead of the first and fourth gears as above set forth. All these different combinations may give rise to so great a number of modifications that the essential principles of these combinations would no longer be clearly visible, these principles being confused by secondary features.

In order to eliminate all these secondary circumstances, which, from the point of view of the present invention, are but constructional details, I believe it necessary to make use of a conventional illustration of the epicycloidal trains which merely discloses the particular properties of their elements which concern the present invention, while neglecting all that relates to modifications.

Such a conventional illustration is shown by Fig. 2. It concerns the arrangement disclosed by Fig. 1.

The gears of each planetary train are shown merely by a circle within which is inscribed the value of the ratio of the train. Circle $R^1$ therefore represents the main train and circle $R^2$ the coupling train. The three elements of each train are represented by arms, each consisting of a mere straight line, extending radially with respect to the circle. The driving shaft is shown by arm 1, the driven shaft by arm 5; the connection between the two trains is shown at 6 and 7, by a line common to both circles.

The two coupling elements are shown, like the other elements, each by a radial line 9 or 10 extending from circle $R^2$. However, these lines are provided, at their ends, with two-armed forks, in order to show that these last mentioned elements can be given two different conditions of operation.

The connections that it is possible to provide are represented by dotted lines. One of these lines, extending between the portion 11a of element 9 and the element 14a, rigid with the driving shaft, shows that this element 9 can be coupled with the driving shaft, that is to say can be caused to move at the same velocity as said shaft. In a similar manner, the dotted line which extends between organs 12a and 20a, the latter being shown as rigid with a main support or fixed member and being accordingly stationary, shows that this element 12a can be stopped by a brake 20a. The same is true for the other group.

The manner of illustrating these mechanisms only shows, as a matter of fact, the possible connections without disclosing the specific structures of these connections. This method of illustrating a planetary mechanism therefore makes it possible to identify the system with respect to the field of the invention.

It should be noted that the example of Fig. 1 has considerable constructional advantages over the modifications above referred to.

One of these advantages consists in the use, in each train, of orbit-wheels having internal teeth 6 and 10, a feature which is of great interest from the point of view of smooth running and silence. Furthermore for usual intervals between the gear ratios, it is possible to employ, in both trains, simple planet-wheels (that is to say non-stepped wheels) which have a high efficiency and are substantially cheaper to manufacture.

It is also an advantage to arrange the system in such manner that the main train supplies the extreme gear ratios, because it is this arrangement which gives the lowest coupling torques.

Finally, the mounting of the planet-wheels of the coupling train on the large sun-wheel of the main train is greatly facilitated by the diameter of this part.

It is only with reference to the proportion of the coupling torques with respect to each other that other solutions might seem more advantageous; but these considerations are of relatively little interest.

Up to now I have considered only the case of four different ratios. But it may be necessary, and this is often the case in industry, to have a transmission giving four ratios in one direction of working as well as in the opposite one. In this case, the transmission above described may be combined with any reversing gear, for instance the planetary reversing gear shown in Fig. 3.

In this figure, the four-gear change speed device made according to the invention has not been shown in detail, since its construction is sufficiently well disclosed by Fig. 1 and its principle by Fig. 2. The whole of this change speed device is designated by reference H.

The shaft 1 of the gear box carries, for instance, a conical sun-wheel 25. In line with this, I place shaft 26, carrying a sun-wheel 27, similar to the above mentioned sun-wheel but arranged in inverse position. Shaft 26 becomes the driving shaft of the whole. A set of planet-wheels 28 is mounted on a transverse spindle 29 overlapping both shaft 1 and shaft 26, and this spindle carries a circular cage 30 provided with external teeth. On said teeth can slide axially, while remaining in mesh therewith, a member 31 operated through a lever 32 engaged, for instance, in a groove 33 of said member 31.

When lever 32 is in its intermediate position (as shown by the drawings) the transmission is interrupted, since member 29, which forms the coupling element of the planetary reversing gear is not in engagement. Opposite member 31, I dispose, for instance, on the driving sun-wheel 27, teeth with which member 31 can mesh when said member 31 is moved in the suitable direction through its lever 32. The whole of the reversing gear is thus rendered rigid when two of these elements are connected together and I obtain the same direction of working as that given by the gear box, with the possibility of making use of the four gear ratios of the gear box.

On the other side of the mechanism I provide a similar toothed element 35, but fixed to the casing of said mechanism. When member 31, actuated through lever 32, reaches this fixed toothed element, while remaining in mesh with member 29, the latter is immobilized and the movement transmitted to driving sun-wheel 27 is reversed by planet-wheels 28, and transmitted to the receiving sun-wheel 25. I then obtain running in the opposite direction, also with the four gear ratios of the box.

In Fig. 4, I have given the conventional illustration of the whole of the reversing gear and the change speed device, designed in accordance with the principles above illustrated, the parts being shown with the same reference numbers. The reversing gear is shown at $R^3$.

Up to now, the invention has been described with coupling elements (clutches and brakes) of the friction type. This system of coupling is that giving the maximum advantage, concerning especially the easy passing from one gear to another one. If this advantage is not to be given much importance, it is of course possible to make use of any other device, for instance rigid coupling means, such as sliding dogs or equivalent means as described in the reversing gear.

As a matter of fact, it should be well understood that the invention is in no way limited to the special construction shown in Figs. 1 to 4. Besides the trains themselves, the coupling elements also may undergo many modifications which may be used in combination with the invention. Finally, I may assemble together not only simple trains, but also more or less complex trains.

Figure 5:
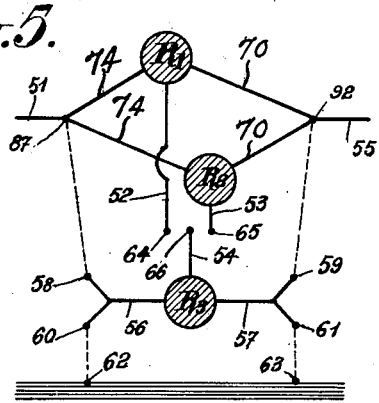
Fig. 5 is a conventional diagrammatical view of a system according to the present invention consisting in the combination of a simple train with a complex train.

Figs. 5 and 6 show, in conventional illustration and in diagrammatic longitudinal section, respectively, another example of a transmission made according to the invention. In this case, I have combined a complex train, of the first degree of freedom, with a simple train. The connection between these two trains is devised in such manner that it can be established between the free element of a simple train (the two other elements of which constitute the coupling elements, in accordance with the principles above stated) and any one of the elements of the complex train which is not the driving element or the resisting element.

The complex train consists for instance (Fig. 5) of the combination of two simple trains of different ratios $R^1$ and $R^2$, two respective elements of which have been interconnected so as to constitute the driving element 51 of the whole, two other elements, each belonging to a different respective elementary train, being interconnected for forming the resisting element 55, the two remaining elements (one in each of the elementary trains which constitute the complex train) remaining free at 52 and 53.

The simple train to be combined to the complex train has one of its elements, for instance 54, arranged in such manner that it may be connected at will either with 52 or with 53, through movable connections established between point 66 of the first train and either of points 64 and 65 of the other train. The two other elements 56 and 57 of the simple train, chosen as coupling train, may, as in the preceding example, be caused to work in two different manners, by bringing into play either of two different couplings. One of these last mentioned couplings, 58 for one element and 59 for the other one, is a clutch device, making it possible to couple each of these elements with the driving shaft 51 for element 56 and with the driven shaft 55 for the other element 57. These possible couplings are shown in dotted lines, as already explained, on the conventional illustration of the device of Fig. 2. The other coupling, shown at 60 for element 56 and at 61 for element 57, is a brake which makes it possible to immobilize these two elements, for instance with respect to the frame of the mechanism. This non-permanent coupling is shown by dotted lines extending between points 60 and 62, 61 and 63, respectively.

If the element 54 of the coupling train is connected with the element 52 of the complex main train, I obtain, as in the preceding case, four different ratios, although I utilize in the complex train only ratio $R^1$. In a similar manner, if element 54 is connected to element 53, I obtain new ratios because I now make use of the second ratio of the complex train, to wit $R^2$. But only three of these ratios are different from the preceding ones because, as well with ratio $R^2$ as with $R^1$, the ratio equal to 1 is obtained when elements 56 and 57 are coupled with the driving shaft 51 and the resisting shaft 55, respectively. Therefore I obtain seven different gear ratios and an arrangement of the trains which is very different from that above described.

Fig. 6 shows, in a diagrammatic manner, a mechanical embodiment, which is wholly different from that of the first example. It will be shown that this construction corresponds to the conventional illustration of Fig. 5, without insisting upon the essential features above described.

The complex train is constituted, for instance, by shaft 51, forming a planet-wheel carrier at 74 and driving, through their axis, the stepped sun-wheels 71, 72 and 73, meshing with planet wheel 70, connected to the resisting shaft, and with planet wheels 52 and 53, forming the free elements mentioned with reference to Fig. 5, respectively.

Ratio $R^1$ is characterized by the ratio of the primitive diameters or respective number of teeth of sun-wheel 52 and planet-wheel 72, multiplied by the same ratio corresponding to planet wheel 71 and sun-wheel 70. This mechanism therefore indeed corresponds, as shown by Fig. 5, to two trains of the first degree $R^1$ and $R^2$, interconnected through their driving element (planet-wheel carrier 74 and planet-wheels 71) and their resisting element (sun-wheel 70), which are common to both of them.

The other train (coupling train) is shown by choosing sun-wheel 54 as connecting element between the two free elements 52 and 53 of the first complex train. In order to comply with this condition, I dispose on a ribbed plate 75 a circular ring 76 which can move axially with respect to said plate but cannot rotate with respect thereto. For instance it is provided with internal teeth engaging corresponding projections of the plate. Said ring can be moved axially through a fork 77 engaging a circular groove 78 in such manner that its projections 66 can engage either the projections 65 of the train the ratio of which is $R^2$ or to the projections 64 of the train the ratio of which is $R^1$.

As the control means for fork 77 must pass through a rotary piece (plate 84), said fork 77 is operatively connected through a system of rods, such as 79, with another piece forming a circular groove 80, which can finally be acted upon by lever 81, which is intended to produce, either in one direction or in the opposite one, the connections above described.

The coupling elements of the whole consist, in the present example, for instance of the sun-wheel carrier 56, provided with its sun-wheels 82 and 83, and of the sun-wheel 57 of the coupling train. It should be well understood that these arrangements are given merely by way of example, and might be modified without departing in any way from the principle of the invention.

In order to control these elements, with two different working velocities, I make use, as in the preceding examples, for instance of clutches and brakes, acting as explained with reference to Fig. 5. By way of examples, I will now describe friction means of a different type, that is to say electro-magnetic clutches and brakes, of a type known per se.

The two coupling elements 56 and 57 are each provided with a metal plate of high magnetic permeability, 84 for element 56 and 85 for element 57. On either side of these plates, I dispose annular elements of metal of the same nature, each provided with a coil of electric wire embedded in the mass, such as 86.

For instance plate 84 is subjected, on one side, to the action of annular part 87, which rotates together with the engine, and to which current is fed from a circular collector 88 upon which bears a brush 89 electrically connected, through a switch 90, with a suitable source of electricity 91. On the opposite side of plate 84 there is disposed, in a similar manner, a similar annular element 62, which is fixed to the casing and can therefore brake plate 84, when it is fed with current through switch 90. Therefore, with this arrangement, it is possible either to couple plate 84 with the engine, or to immobilize it, as in the preceding example.

For plate 85, I dispose in a similar way rotary coil 92, rigid with the driven shaft and capable of coupling said plate with said shaft, and stationary coil 63 capable of immobilizing it. Through switch 90, current can be fed to the desired coils. I thus obtain the couplings or the brakings which produce the operation described with reference to Fig. 5.

This combination of planetary trains has characteristics which must be pointed out. As a matter of fact, it is equivalent to two gear boxes having each four distinct gear ratios, with common direct drive (ratio equal to 1). If lever 81 is moved in one direction, I employ for instance the ratio $R^1$ of the complex train and I obtain four gear ratios in forward drive. If said lever 81 is moved in the opposite direction, I make use of the second ratio $R^2$ of the complex train, which also gives four ratios of transmission, but only three of them are different from those obtained with ratio R¹ since direct drive is the same in both cases.

According to the values given to R¹ and R², I may obtain very different effects. For instance the first of these two ratios may give four speeds in forward gear and the second three speeds in forward drive at very different intervals and a speed in reverse gear. This combination is therefore very different from that illustrated by Fig. 4, although it also includes three planetary trains.

In particular, if such an arrangement were fitted on an automobile vehicle, for a position of lever 81, I would obtain a four speed gear box with all the characteristics that result from the provision of four gear ratios. In the other position of lever 81 I would obtain a gear box giving three speeds at larger intervals from one another and a reverse gear. This would make it possible to satisfy the supporters of either system, and this with a mechanism the complexity of which is not greater than that of mechanisms such as are used at the present time for obtaining a much lower number of gear ratios. Of course, many other solutions might be obtained, for instance by increasing the number of reverse gears.

It should also be noted, with reference to the gears described in Fig. 6, that this system, if it is less favorable to the production of a highly silent running, however makes it possible to distribute more evenly the coupling torques, and this in a general manner. As it was explained in the preamble, the examples above given can concern only specific cases. For instance, Fig. 3 showed the combination of a reversing gear, known per se, with a gear box made according to the invention and consisting in the combination of two simple trains. Fig. 4 shows the conventional illustration of this combination. But it should be noted that this disposition is not limited to the combination of these two trains with a speed reversing gear. If the ratio R³ of this device is modified in such manner that, instead of being a speed reversing gear it becomes a speed multiplying or a speed reducing gear, the mechanism illustrated by Fig. 4 becomes a gear box making it possible to obtain eight different gear ratios through the combination of three simple trains.

The eight gear ratios are obtained in the following manner:

*Eighth speed.*—Train R³ in engagement (connection of group 29 with the driving shaft 26). Train R² having its two groups in engagement (connection of 11a with 14a and 11b with 14b).

*Seventh speed.*—Train R³ operated. For train R², connection of 11a with 14a and of 12b with 20b.

*Sixth speed.*—Train R³ operated. For train R², connection of 12a with 20a and of 11b with 14b.

*Fifth speed.*—Train R³ operated. For train R², connection of 12a with 20a and of 12b with 20b.

*Fourth speed.*—Train R³ braked. For train R², connection of 11a with 14a and 11b with 14b.

*Third speed.*—Train R³ braked. For train R² connection of 11a with 14a and of 12b with 20b.

*Second speed.*—Train R³ braked. For train R², connection of 11a with 20a and 11b with 14b.

*First speed.*—Train R³ braked. For train R², connection of 12a with 20a and of 12b with 20b.

In a general manner, while I have, in the above description, disclosed what I deem to be practical and efficient embodiments of the present invention, it should be well understood that I do not wish to be limited thereto as there might be changes made in the arrangement, dispositon, and form of the parts without departing from the principle of the present invention as comprehended within the scope of the appeded claims.

What I claim is:

1. A planetary gearing system for connecting two shafts comprising a principal planetary train and an auxiliary planetary train each comprising three elements, means permanently connecting elements of the principal train one to each of said shafts, two elements of the auxiliary train being rotatable with respect to said shafts, means connecting the third element of the principal train to one element of the auxiliary train, and means to control the other two elements of the auxiliary train, said last connecting means during operation comprising the only fixed operative connection between said principal train and any element of said auxiliary train.

2. A planetary gearing system for connecting two shafts comprising a principal planetary train and an auxiliary planetary train each comprising three elements, means permanently connecting elements of the principal train one to each of said shafts, two elements of the auxiliary train being rotatable with respect to said shafts each about the axis of one of the shafts respectively, means connecting the third element of the principal train to the third element of the auxiliary train, and means to control the first two elements of the auxiliary train, said last connecting means during operation comprising the only fixed operative connection between said principal train and any element of said auxiliary train.

3. A planetary gearing system for connecting two shafts comprising a principal planetary train and an auxiliary planetary train each comprising three elements, means permanently connecting elements of the principal train one to each of said shafts, the elements of the auxiliary train being rotatable with respect to said shafts, means connecting the third element of the principal train to one element of the auxiliary train, and means to control the other two elements of the auxiliary train, including means for selectively connecting one of said last two elements of the auxiliary train to one of said shafts or for braking the same, said last connecting means during operation comprising the only fixed operative connection between said principal train and any element of said auxiliary train.

4. A planetary gearing system for connecting two shafts comprising a principal planetary train and an auxiliary planetary train each comprising three elements, means permanently connecting elements of the principal train one to each of said shafts, the elements of the auxiliary train being rotatable with respect to said shafts, means connecting the third element of the principal train to one element of the auxiliary train, and means to control the other two elements of the auxiliary train, including means for selectively connecting said last two elements of the auxiliary train one to each of said shafts or for braking the same.

5. A system according to claim 4 in which the trains are so devised that the highest speed is obtained by coupling the other two elements of the auxiliary train with the two shafts, respectively, and the lowest speed is obtained by locking in fixed position both of said last mentioned elements.

6. A planetary gearing system for connecting two shafts comprising a principal planetary train including a sun gear rigidly mounted on one of said shafts, a planet carrier rigidly mounted on the other shaft, planetary gears on said planet carrier meshing with said sun gear, an orbit gear meshing with said planetary gears, a member supporting said orbit gear for rotation about the axis of one of said shafts, a transmission comprising a sun gear mounted to turn about the axis of one of said shafts, planetary gears rotatably mounted on said rotatable member and engaging said second sun gear, and an orbit gear meshing with said planetary gears and mounted for rotation about the axis of one of said shafts, and means for controlling said second sun and orbit gears, said rotatable member during operation comprising the only fixed operative connection between said principal train and any element of said transmission.

7. A device as claimed in claim 1, in which the control means for said last two elements are independent of each other.

8. In a device as claimed in claim 1, said control means including means for selectively coupling one of said last two elements of the auxiliary train to one element of the principal train.

9. A system of the type described for providing a multiple speed transmission between a driving shaft and a driven shaft, which comprises, in combination, at least two cycloidal trains, each train including a small sun wheel with external teeth, a large orbit wheel with internal teeth concentric with the first one, a planet wheel carrier coaxial with both wheels, and a single set of planet wheels journalled in said carrier and meshing with both of said wheels respectively, the first train having one of said sun and orbit wheels permanently connected with one of said shafts and the planet wheel carrier permanently connected with the other shaft, means for rigidly interconnecting the other of the sun and orbit wheels of said first train with the planet wheel carrier of the other train, independent means for locking in fixed position each of the sun and orbit wheels of the second train respectively, and independent means for selectively locking these two last mentioned sun and orbit wheels with said shafts, respectively, whereby both said trains move to transmit torque independently during at least some of the speed ratios of the system.

10. A system of the type described for providing a multiple speed transmission between a driving shaft and a driven shaft, which comprises, in combination, at least two cycloidal trains, each train including a small sun wheel with external teeth, a large orbit-wheel with external teeth concentric with the first one, a planet-wheel carrier coaxial with both of said wheels, and a single set of planet wheels journalled in said carrier and meshing with both of said sun and orbit wheels respectively, the first train having its sun wheel permanently coupled with the driving shaft and its planet-wheel carrier permanently coupled with the driven shaft, the orbit wheel of said first train being integral with the planet-wheel carrier of the other train, braking means for independently stopping each of the sun and orbit wheels of the second train, respectively, and clutch means for independently coupling these two last mentioned sun and orbit wheels with said shafts, respectively, whereby both said trains move to transmit torque independently during at least some of the speed ratios of the system.

11. A planetary gearing system for connecting two shafts comprising two principal planetary trains and an auxiliary planetary train each comprising three elements, means permanently connecting elements of each principal train one to each of said shafts, the elements of the auxiliary train being rotatable with respect to said shafts, means for selectively connecting the third elements of the principal trains to one element of the auxiliary train, and means to control the other two elements of the auxiliary train.

GASTON FLEISCHEL.